United States Patent
Kim et al.

(10) Patent No.: US 10,461,666 B2
(45) Date of Patent: Oct. 29, 2019

(54) ENERGY HARVESTER FOR ELECTROSTATIC ENERGY

(71) Applicant: SAMSUNG ELECTRONICS CO., LTD., Suwon-si (KR)

(72) Inventors: Sangwoo Kim, Yongin-si (KR); Keun Young Lee, Suwon-si (KR); Seongsu Kim, Seoul (KR); Juhyuck Lee, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1164 days.

(21) Appl. No.: 14/593,488

(22) Filed: Jan. 9, 2015

(65) Prior Publication Data

US 2015/0194911 A1 Jul. 9, 2015

(30) Foreign Application Priority Data

Jan. 9, 2014 (KR) .................. 10-2014-0003067

(51) Int. Cl.
| | | |
|---|---|---|
| H02N 1/04 | (2006.01) | |
| H02N 1/06 | (2006.01) | |
| H02N 1/12 | (2006.01) | |
| H02N 1/00 | (2006.01) | |
| H02N 1/10 | (2006.01) | |
| H02N 1/08 | (2006.01) | |

(52) U.S. Cl.
CPC .................. *H02N 1/04* (2013.01); *H02N 1/00* (2013.01); *H02N 1/06* (2013.01); *H02N 1/08* (2013.01); *H02N 1/10* (2013.01); *H02N 1/12* (2013.01)

(58) Field of Classification Search
CPC .. H02N 1/00; H02N 1/04; H02N 1/06; H02N 1/08; H02N 1/10; H02N 1/12

USPC .................................................. 310/310, 309
See application file for complete search history.

(56) References Cited

U.S. PATENT DOCUMENTS

| | | |
|---|---|---|
| 2013/0049531 A1 | 2/2013 | Wang et al. |
| 2013/0193930 A1* | 8/2013 | Baugher ............. H01L 41/1138 320/137 |
| 2015/0035408 A1* | 2/2015 | Despesse ................. H02N 1/08 310/310 |

FOREIGN PATENT DOCUMENTS

| | | |
|---|---|---|
| CN | 103107737 A | 5/2013 |
| JP | 2013-85437 A | 5/2013 |
| KR | 2002-0050318 A | 6/2002 |

(Continued)

OTHER PUBLICATIONS

Peng Bai et al., "Dipole-moment-induced effect on contact electrification for triboelectric nanogenerator", Nano Research, ISSN 1998-0124, 20 pgs. total, Retrieved from http://www.thenanoresearch.com on Mar. 27, 2014.

(Continued)

*Primary Examiner* — Julio C. Gonzalez
*Assistant Examiner* — Alexander A Singh
(74) *Attorney, Agent, or Firm* — Sughrue Mion, PLLC

(57) ABSTRACT

Provided is an electrostatic energy harvester Including a lower electrode; a ferroelectric material layer which is disposed on the lower electrode and formed of a poled ferroelectric material; a friction-charged body which is adapted to be repeatedly contacted with and separated from the ferroelectric material layer and has an electric susceptibility different from an electric susceptibility of the ferroelectric material layer; and an upper electrode provided on the friction-charged body.

8 Claims, 7 Drawing Sheets

(56) References Cited

FOREIGN PATENT DOCUMENTS

KR  10-2012-0027468 A  3/2012

OTHER PUBLICATIONS

Sihong Wang et al., "Nanoscale Triboelectric-Effect-Enabled Energy Conversion for Sustainably Powering Portable Electronics", Nano Letters, 2012, pp. 6339-6346.

Shenck, Nathan S., et al., Energy Scavenging with Shoe-Mounted Piezoelectrics, May-Jun. 2001, IEEE, pp. 30-42.

* cited by examiner

ENERGY HARVESTER FOR ELECTROSTATIC ENERGY

CROSS-REFERENCE TO RELATED APPLICATION

This application claims priority from Korean Patent Application No. 10-2014-0003067, filed on Jan. 9, 2014 in the Korean Intellectual Property Office, the disclosure of which is incorporated herein in its entirety by reference.

BACKGROUND

1. Field

Apparatuses and methods consistent with exemplary embodiments relate to an electrostatic energy harvester which controls friction-generated electrostatic characteristics using an electric potential generated by ferroelectric characteristics of a material and generates high-power energy by amplifying an electric charge difference of the material, caused by the friction.

2. Description of the Related Art

An "electrostatic energy harvester" harvests energy from friction of two materials which are rubbed against each other using an electrostatic phenomenon occurring due to the friction.

The electrostatic energy harvester is an eco-friendly energy harvester, which is capable of infinitely extracting electric energy from wasting mechanical energy generated from ambient micro-vibration or human movements, unlike eco-friendly energy such as existing solar cells, wind power, fuel cells, and so forth. As electrostatic energy harvesters have a high conversion efficiency, a small size, and light-weight, energy conversion using such electrostatic characteristics has been viewed as emerging technology having a great ripple effect, which can lead to technical innovations, especially when converged with nano technologies.

Conventional electrostatic energy harvesters generally have power determined according to material selection based on triboelectric series. Thus, to improve power of the energy harvesters, most studies have been done on structural or material surface shape control of the energy harvesters, rather than on material selection.

SUMMARY

Provided is an energy harvester.

Additional aspects will be set forth in part in the description which follows and, in part, will be apparent from the description, or may be learned by practice of the presented exemplary embodiments.

According to an aspect of an exemplary embodiment, an energy harvester may include: a lower electrode; a ferroelectric material layer which is disposed on the lower electrode and formed of a poled ferroelectric material; a friction-charged body which is adapted to be repeatedly contacted with and separated from the ferroelectric material layer and has an electric susceptibility different from an electric susceptibility of the ferroelectric material layer; and an upper electrode provided on the friction-charged body.

The friction-charged body and the ferroelectric material layer have opposite charging characteristics.

The friction-charged body generates triboelectricity when the friction-charged body are separated from the ferroelectric material layer and the friction-charged body is in contact with the ferroelectric material layer.

The ferroelectric material layer comprises at least one of polyvinylidene difluoride (PVDF), lead zirconate titanate (PZT), platinum oxide (PTO), Barium tin oxide (BTO), bismuth ferric oxide (BFO), KNbO3, NaNbO3, and GeTe.

The energy harvester may further include: outgoing lines connected to the lower electrode and the upper electrode, respectively; and a storage battery charged through the outgoing lines.

The energy harvester may further include: a first rectifying diode connected between one of the outgoing lines and the storage battery; and a second rectify diode connected between another one of the outgoing lines and the storage battery.

A type of poling applied to the ferroelectric material layer corresponds to charging characteristics of the ferroelectric material layer with respect to the friction-charged body.

The type of poling corresponds to negative poling when the ferroelectric material layer has a negative charging property in relation to the friction-charged body.

The type of poling corresponds to positive poling when the ferroelectric material layer has a positive charging property in relation to the friction-charged body.

According to another aspect of an exemplary embodiment, an energy harvester may include: a lower electrode; a ferroelectric material layer which is disposed on the lower electrode and formed of a poled ferroelectric material; and a friction-charged body which is adapted to be repeatedly contacted and separated from the ferroelectric material layer, has an electric susceptibility different from an electric susceptibility of the ferroelectric material layer, and functions as an upper electrode to exchange electrons with the lower electrode.

The friction-charged body and the ferroelectric material layer have opposite charging characteristics.

The friction-charged body generates triboelectricity when the friction-charged body are separated from the ferroelectric material layer and the friction-charged body is in contact with the ferroelectric material layer.

The ferroelectric material layer comprises at least one of polyvinylidene difluoride (PVDF), lead zirconate titanate (PZT), platinum oxide (PTO), Barium tin oxide (BTO), bismuth ferric oxide (BFO), KNbO3, NaNbO3, and GeTe.

The friction-charged body comprises metal.

The ferroelectric material layer comprises polyvinylidene difluoride (PVDF), and the friction-charged body comprises aluminum (Al).

The ferroelectric material layer comprising PVDF is negative-poled.

A type of poling applied to the ferroelectric material layer corresponds to charging characteristics of the ferroelectric material layer with respect to the friction-charged body.

The energy harvester may further include: outgoing lines connected to the lower electrode and the friction-charged body, respectively; and a storage battery connected to the outgoing lines.

The energy harvester may further include: a first rectifying diode connected between one of the outgoing lines and the storage battery; and a second rectifying node connected between another one of the outgoing lines and the storage battery.

According to another aspect of an exemplary embodiment, an electronic device may include an energy harvester, wherein the energy harvester may include a lower electrode; a ferroelectric material layer which is disposed on the lower electrode and formed of a poled ferroelectric material; a friction-charged body which is adapted to be repeatedly contacted with and separated from the ferroelectric material layer and has an electric susceptibility different from an electric susceptibility of the ferroelectric material layer; and an upper electrode provided on the friction-charged body.

According to another aspect of an exemplary embodiment, an electronic device may include an energy harvester, wherein the energy harvester may include a lower electrode; a ferroelectric material layer which is disposed on the lower electrode and formed of a poled ferroelectric material; and a friction-charged body which is adapted to be repeatedly contacted and separated from the ferroelectric material layer, has an electric susceptibility different from an electric susceptibility of the ferroelectric material layer, and functions as an upper electrode to exchange electrons with the lower electrode.

According to another aspect of an exemplary embodiment, a method of controlling a ferroelectric material layer and a friction-charged body of an energy harvester may include: applying a type of poling to the ferroelectric material layer based on charging characteristics of the ferroelectric material layer with respect to the friction-charged body; making contact between the ferroelectric material layer and the friction-charged body to flow electrons directly from the fiction-charged body to the ferroelectric material layer; and separating the ferroelectric material layer from the friction-charged body to flow electrons out of the lower electrode through a wire connected to the friction-charged body.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
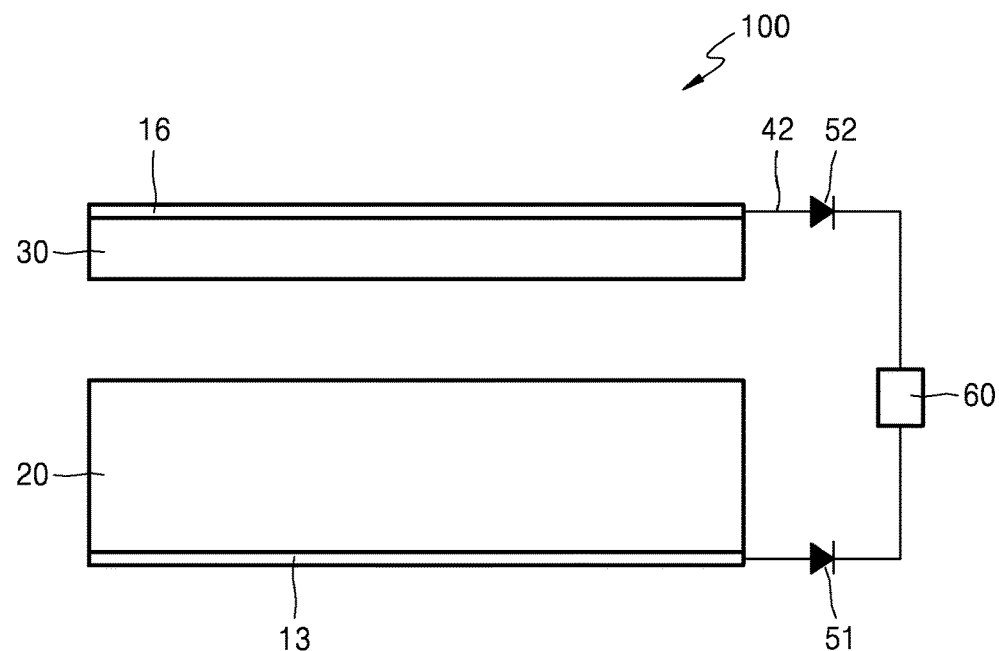
FIG. 1A is a side cross-sectional view of an electrostatic energy harvester having ferroelectric characteristics coupled according to an exemplary embodiment.

Various embodiments will now be described with reference to the accompanying drawings, throughout which like reference numerals will be used to indicate like elements. In the specification, various descriptions will be made to provide understanding of exemplary embodiments. However, it will be apparent that these embodiments may be carried out without particular descriptions. In other examples, well-known structures and devices will be provided in the form of block diagrams to facilitate the descriptions of the embodiments.

The simplified description of one or more embodiments will be provided to provide the fundamental understanding of the exemplary embodiments. This section does not correspond to a comprehensive summary of all possible embodiments, and is not intended to identify a core element among all elements or to cover the range of all the embodiments. The purpose is to provide the concept of one or more embodiments in a simplified form as an introduction to a detailed description to be provided below. Expressions such as "at least one of" do not necessarily modify an entirety of a following list and do not necessarily modify each member of the list, such that "at least one of a, b, and c" should be understood as including only one of a, only one of b, only one of c, or any combination of a, b, and c.

FIG. 1 is a side cross-sectional view of an electrostatic energy harvester having ferroelectric characteristics coupled according to an exemplary embodiment of the present disclosure.

As illustrated in FIG. 1, an electrostatic energy harvester 100 having ferroelectric characteristics according to an exemplary embodiment may include a lower electrode 13, a ferroelectric material layer disposed on the lower electrode 13, a friction-charged body 30 positioned on the ferroelectric material layer 20, and an upper electrode 16 disposed on the friction-charged body 30. The lower electrode 13 and the upper electrode 16 may include any material as long as the material is used for an electrode, and may include, for example, indium tin oxide (ITO).

Figure 2A:
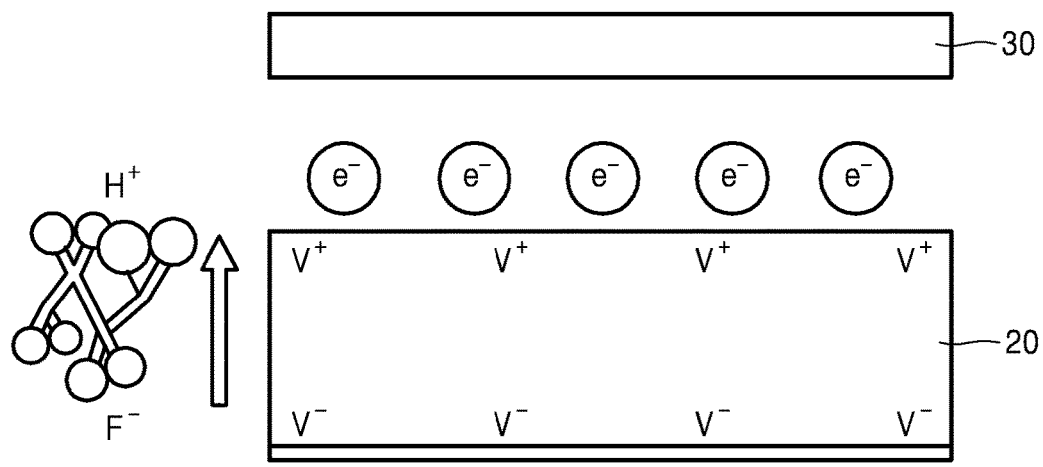
FIGS. 2A and 2B illustrate a state where negative poling and positive poling are applied to an electrostatic energy harvester having ferroelectric characteristics coupled according to an exemplary embodiment.
Figure 2B:
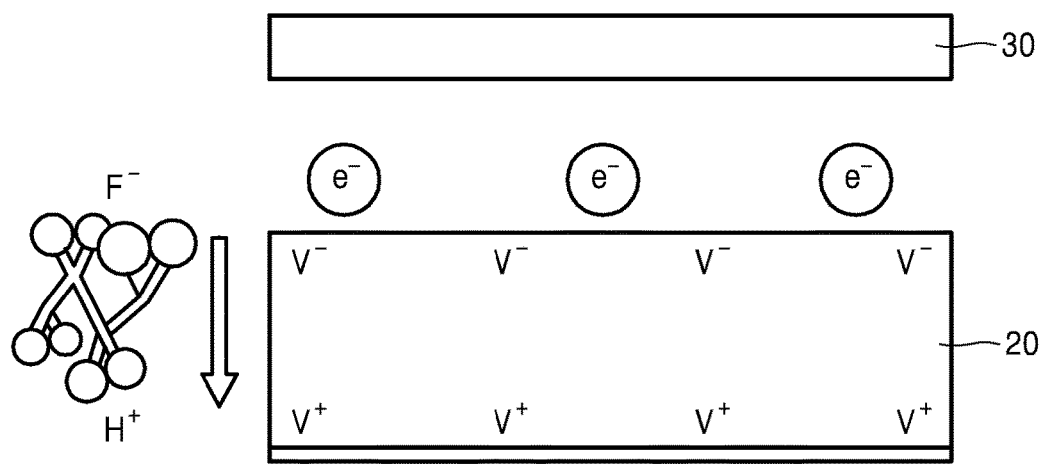

The ferroelectric material layer 20 may be disposed on the lower electrode 13. The polarity of the ferroelectric material may be aligned through poling, and thus poling is performed. During the process of poling, the ferroelectric material may be subjected to a high electric field that orients all the dipoles of the ferroelectric material in the direction of the electric field. For the ferroelectric material, positive poling and negative poling both may be performed as shown in FIGS. 2A and 2B.

In this case, a type of poling may be determined according to charging characteristics of the friction-charged body 30. Here, the charging characteristics indicate whether the friction-charged body 30 may be charged positively (+) or negatively (−) with respect to the ferroelectric material layer 20.

This ferroelectric material may include at least one of polyvinylidene difluoride (PVDF), lead zirconate titanate (PZT), platinum oxide (PTO), Barium tin oxide (BTO), bismuth ferric oxide (BFO), KNbO3, NaNbO3, and GeTe. The friction-charged body 30 may repeatedly contact the ferroelectric material layer 20, and be formed of a material having charging characteristics that are opposite to those of the ferroelectric material layer 20.

The friction-charged body 30 is repeatedly contacted with and separated from the ferroelectric material as illustrated in FIGS. 3A through 3E to generate triboelectricity and thereby to generate power.

FIGS. 2A and 2B illustrate a state in which negative poling and positive poling are applied to an electrostatic energy harvester 100 having ferroelectric characteristics according to an exemplary embodiment. In FIGS. 2A and 2B, PVDF is used for the ferroelectric material layer 20, and aluminum (Al) is used for the friction-charged body 30.

When negative poling is applied to the PVDF of the ferroelectric material layer 20, the PVDF is internally poled to V+ toward the friction-charged body 30 as illustrated in FIG. 2A. If positive poling is applied to the PVDF of the ferroelectric material layer 20, the PVDF is internally poled to V− toward the friction-charged body 30 as illustrated in FIG. 2B.

Figure 5:
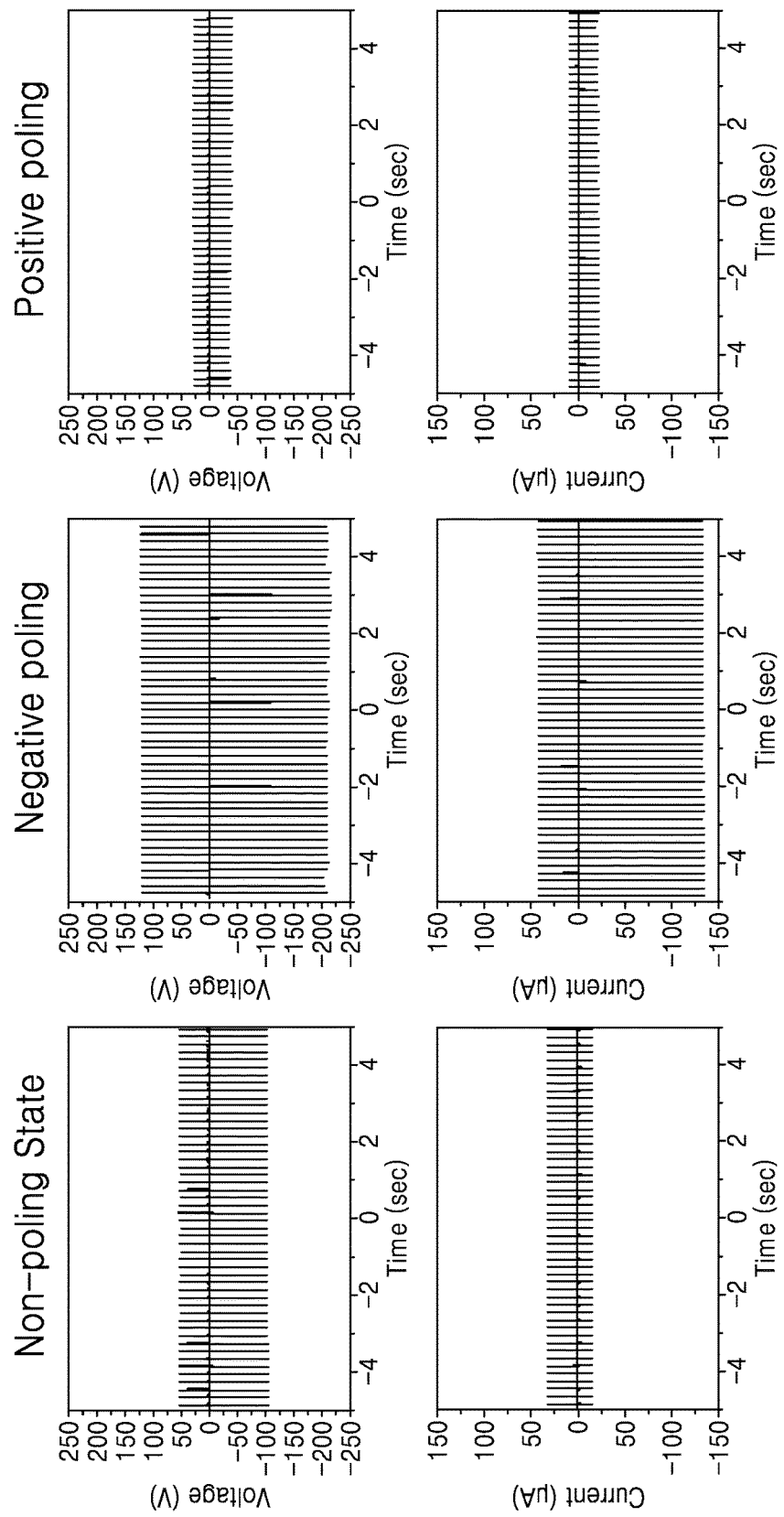
FIG. 5 is a graph illustrating voltage and current characteristics when poling is applied to and is not applied to an electrostatic energy harvester having ferroelectric characteristics coupled according to an exemplary embodiment.

In this case, PVDF has a negative (−) charging property in relation to Al which then has a positive (+) charging property. Thus, when Al and PVDF come into contact, electrons flow from Al to PVDF. Accordingly, if negative poling is applied to PVDF, output values of a voltage and a current generated by triboelectricity may be high. As shown in FIG. 5, output values of a voltage and a current generated by the electrostatic energy harvester 100 are relatively high when negative poling is applied in comparison to when polling is not performed and when positive poling is performed.

In other words, depending on charging characteristics of the ferroelectric material layer 20 with respect to the friction-charged body 30, the type of poling applied to the ferroelectric material layer 20 is determined. As described above, negative poling is applied when the ferroelectric material layer 20 has a negative charging property in relation to the friction-charged body 30. However, positive poling is applied when the ferroelectric material layer 20 has a positive charging property in relation to the friction-charged body 30.

A mechanism associated with power production will be described below with reference to FIGS. 3A through 3E.

In FIGS. 3A through 3E, ITO is used for a lower electrode, PVDF is used for a ferroelectric material, and Al is used for an upper electrode as a friction-charged body. In this case, negative poling is applied to PVDF because PVDF can generate higher power in relation to Al when negative poling is applied than when positive poling is applied as shown in FIG. 5.

Figure 3A:
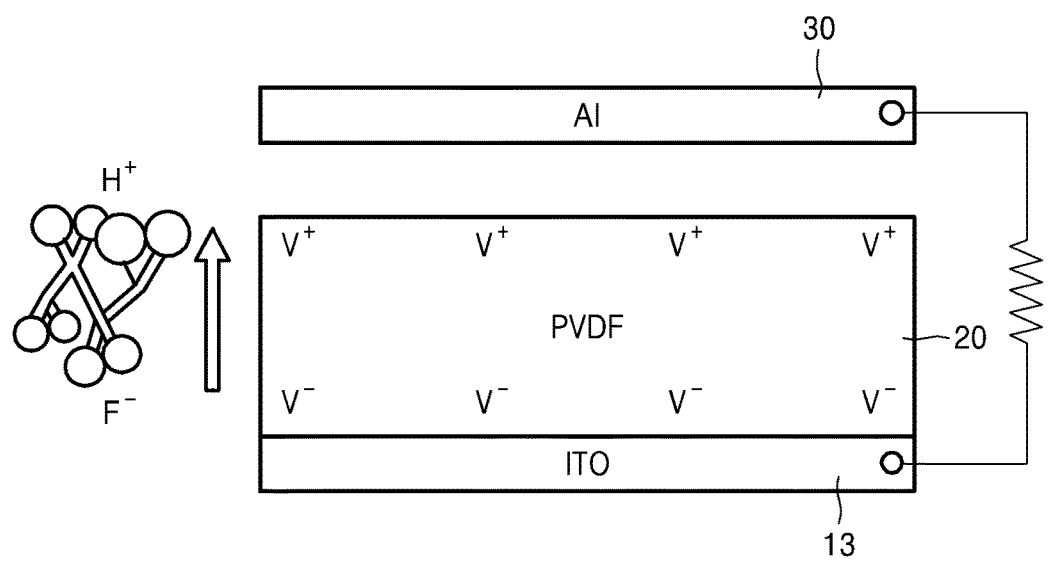
FIGS. 3A through 3E illustrate driving principles of an electrostatic energy harvester having ferroelectric characteristics coupled according to an exemplary embodiment.

FIG. 3A illustrates an initial state and in this state, a press is applied such that the ferroelectric material layer 20 and the friction-charged body 30 contact each other.

Figure 3B:
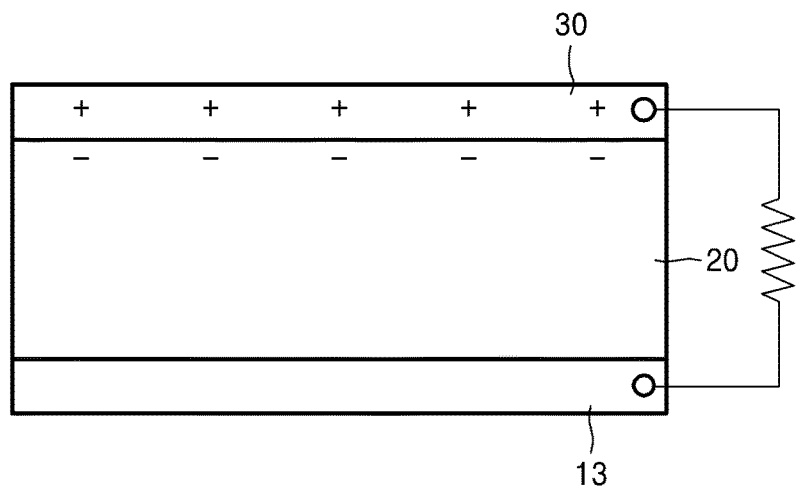

As shown in FIG. 3B, the ferroelectric material layer 20 and the friction-charged body 30 contact each other to generate friction and as a result, electrons flow from Al to PVDF. Accordingly, Al is charged positively (+) and the ferroelectric layer 20 is charged negatively (−).

Figure 3C:
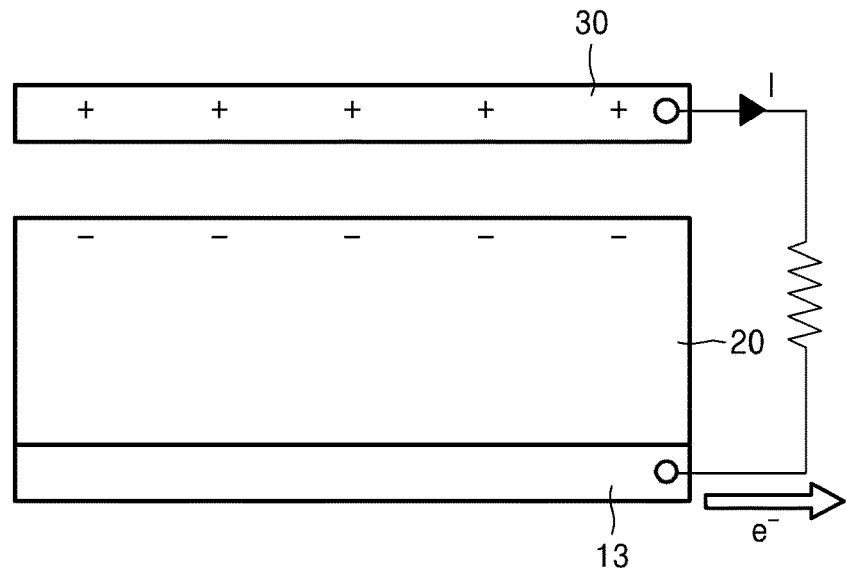
Figure 4:
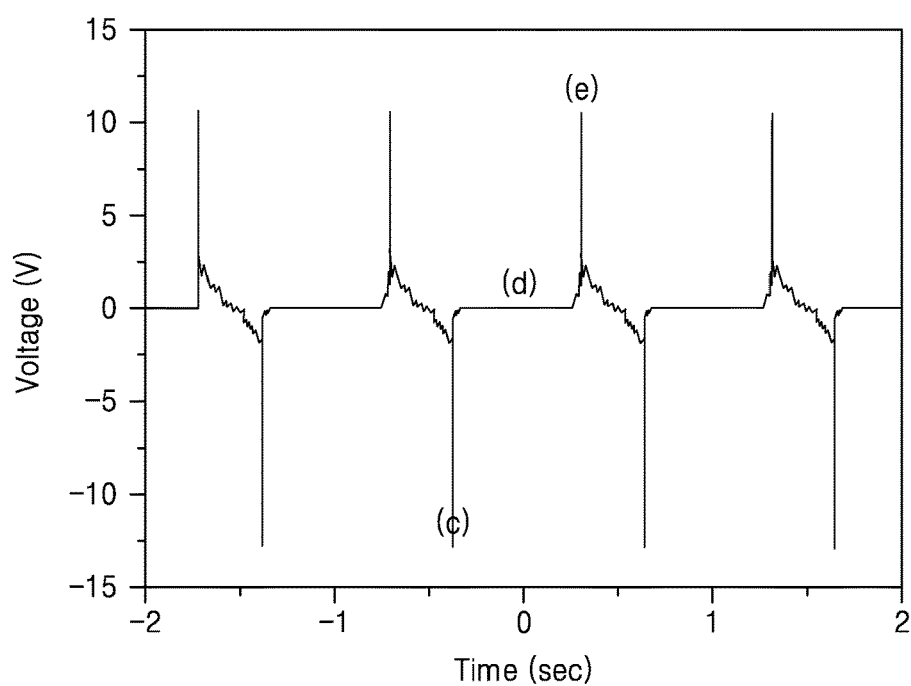
FIG. 4 illustrates a voltage peak of an electrostatic energy harvester having ferroelectric characteristics coupled according to an exemplary embodiment over time.

FIG. 3C illustrates a state in which the friction-charged body 30 is separated from the ferroelectric material layer 20 after contacting the ferroelectric material layer 20, such that electrons move as illustrated in FIG. 3C and thus a voltage peak may be generated as illustrated in (c) of FIG. 4.

Figure 3D:
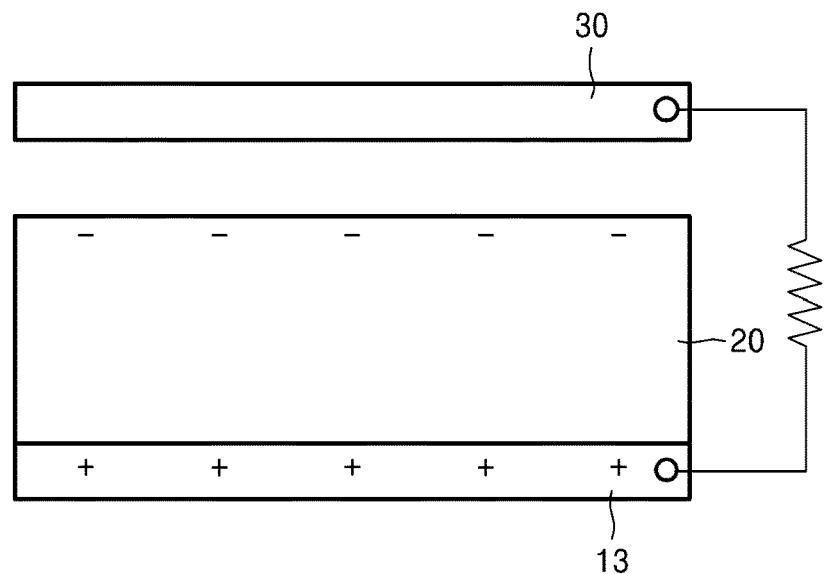

Thereafter, electrical equivalence is achieved, entering a state illustrated in FIG. 3D. This state is indicated by (d) in FIG. 4.

Figure 3E:
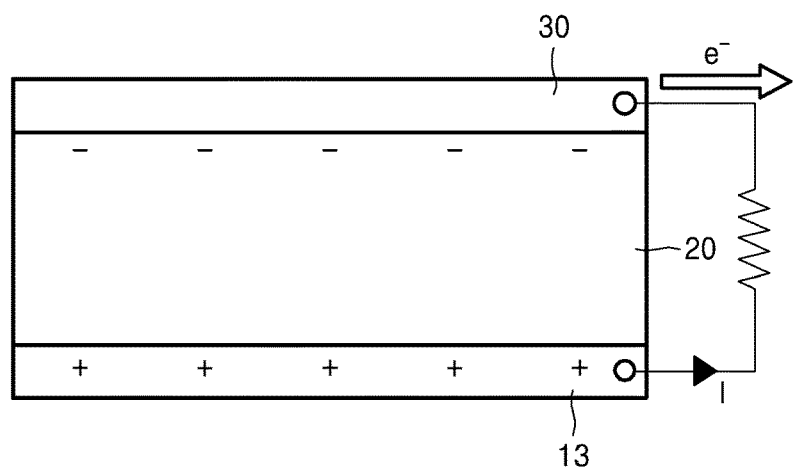

As illustrated in FIG. 3E, a press is applied such that the ferroelectric material layer 20 and the friction-charged body 30 contact each other. When the ferroelectric material layer 20 and the friction-charged body 3 contact each other, electrons move as illustrated in FIG. 3E due to an electrical potential difference between the ferroelectric material layer 20 and the lower electrode 13. And thus a voltage peak as indicated in (e) of FIG. 4 is generated.

Thereafter, electrical equivalence is achieved over time and the electro energy harvester 100 turns back to the state illustrated in FIG. 3B.

As a cycle of FIGS. 3A through 3E is repeated continuously, a triboelectric effect may be generated and an energy harvester using such electrostatic energy may be obtained.

Conventional electrostatic energy harvesters generally have power determined according to material selection based on triboelectric series. Thus, to improve power of the energy harvesters, most studies have been done on structural or material surface shape control of the energy harvesters, rather than on material selection. On the other hand, the energy harvester according to an embodiment controls friction-generated electrostatic characteristics by using an electric potential generated by ferroelectric characteristics and amplifies an electric charge difference of a material caused by friction to maintain the power of the electrostatic energy harvester, thereby greatly improving power.

That is, to improve the power of the friction-generated electrostatic energy, an electric charge difference caused by friction is amplified using an electric potential generated by ferroelectric characteristics, thereby improving the power of the electrostatic energy harvester. The leftmost side of FIG. 5 shows a state having no ferroelectric characteristics (that is, a non-poling state), and it can be seen that when poling is applied for ferroelectric characteristics as illustrated in the middle side of FIG. 5, power is higher than the non-poling state.

Meanwhile, for use as an energy harvester, outgoing lines 41 and 42 may be connected to a lower electrode and an upper electrode, respectively. An energy storage 60 such as a storage battery may be electrically connected to the outgoing lines 41 and 42. Rectifying diodes 51 and 52 may be connected between the outgoing line 41 and the storage battery, respectively.

A load may be connected to the outgoing lines 41 and 42, and thus a bulb may be directly lighted.

The rectifying diodes 51 and 52 may allow current to flow in only one direction toward the energy storage 50. Thus, the rectifying diodes 51 and 52 prevent the energy storage 60 such as the storage battery from being discharged due to the reverse flow of the current.

Figure 1B:
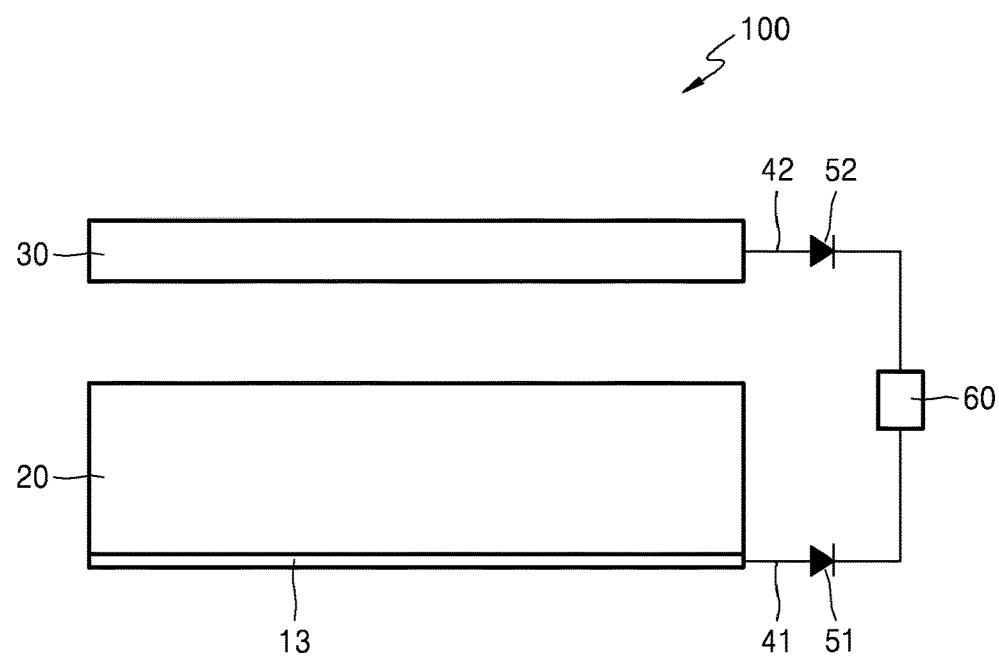
FIG. 1B is a side cross-sectional view of an electrostatic energy harvester having ferroelectric characteristics coupled according to another exemplary embodiment.

FIG. 1B illustrates another exemplary embodiment.

The another embodiment illustrated in FIG. 1B is similar to that illustrated in FIG. 1A, except that the friction-charged body 30 also functions as an upper electrode, although there are the friction-charged body 30 and the upper electrode 16 disposed on the friction-charged body 30 in FIG. 1A. In other words, the friction-charged body 30 and the upper electrode 16 may be integrally formed. Other details of FIG. 1B are the same as those of FIG. 1A, and thus will not be described again.

Figure 6:
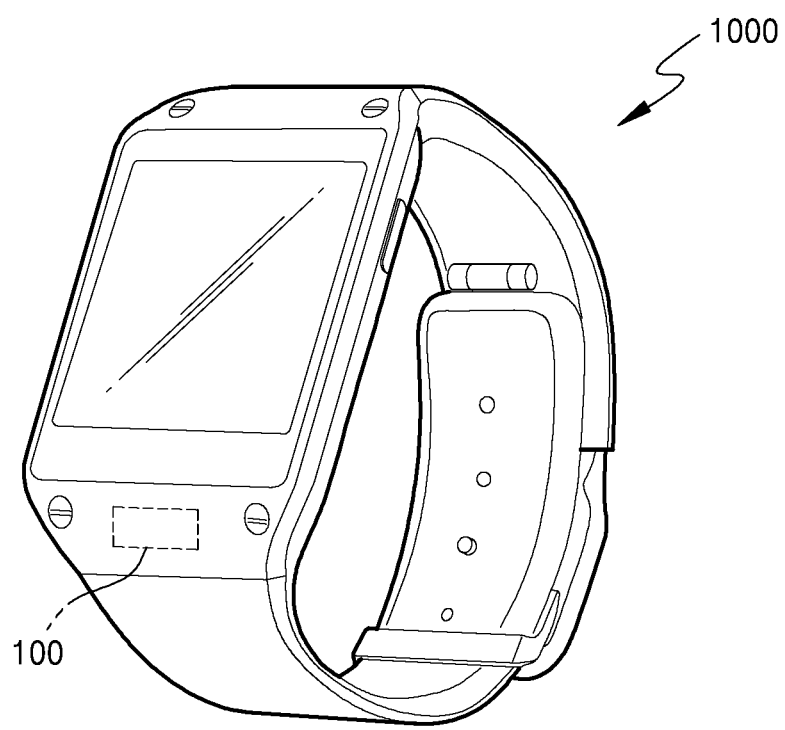
FIG. 6 illustrates an electronic device comprising the energy harvester.

The energy harvester 100 represented in FIG. 1A and FIG. 1B can be used in various electronic devices that may cause vibration. FIG. 6 illustrates an electronic device 1000 comprising the energy harvester 100.

As shown in FIG. 6, the electronic device 1000 may comprise the energy harvester represented in FIG. 1A and FIG. 1B. While FIG. 2 shows that the electronic device 1000 is an wearable device such as a smart watch, exemplary embodiments are not limited thereto. For example, the electronic device 1000 may be a mobile device such as a cellular phone, a touch pad, a keyboard, or a wireless sensor in which internet of things (IOT) may be implemented. The energy harvester 100 may be used as an energy source of the electronic device 1000.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An energy harvester comprising:
   a lower electrode;
   a ferroelectric material layer which is disposed on the lower electrode and formed of a negatively poled ferroelectric material or a positively poled ferroelectric material, the ferroelectric material layer having a first electric susceptibility;
   a friction-charged body which is adapted to be repeatedly contacted with and separated from the ferroelectric material layer and has a second electric susceptibility different from the first electric susceptibility; and
   an upper electrode provided on the friction-charged body,
   wherein the ferroelectric material layer is formed of the negatively poled ferroelectric material and has a negative charging property in relation to the friction-charged body, or
   wherein the ferroelectric material layer is formed of the positively poled ferroelectric material and has a positive charging property in relation to the friction-charged body.

2. The energy harvester of claim 1, wherein the friction-charged body and the ferroelectric material layer have opposite charging characteristics.

3. The energy harvester of claim 1, wherein the friction-charged body generates triboelectricity when the friction-charged body are separated from the ferroelectric material layer and the friction-charged body is in contact with the ferroelectric material layer.

4. The energy harvester of claim 1, wherein the ferroelectric material layer comprises at least one of polyvinylidene difluoride (PVDF), lead zirconate titanate (PZT), platinum oxide (PTO), Barium tin oxide (BTO), bismuth ferric oxide (BFO), KNb03, NaNb03, and GeTe.

5. The energy harvester of claim 1, further comprising:
   outgoing lines connected to the lower electrode and the upper electrode, respectively; and
   a storage battery charged through the outgoing lines.

6. The energy harvester of claim 5, further comprising:
   a first rectifying diode connected between one of the outgoing lines and the storage battery; and
   a second rectify diode connected between another one of the outgoing lines and the storage battery.

7. The energy harvester of claim 1, wherein a type of poling applied to the ferroelectric material layer corresponds to charging characteristics of the ferroelectric material layer with respect to the friction-charged body.

8. An electronic device comprising:
   an energy harvester comprising:
      a lower electrode;
      a ferroelectric material layer disposed on the lower electrode and formed of a negatively poled ferroelectric material or a positively poled ferroelectric material, the ferroelectric material layer having a first electric susceptibility;
      a friction-charged body which is adapted to be repeatedly contacted with and separated from the ferroelectric material layer and has a second electric susceptibility different from the first electric susceptibility; and
      an upper electrode provided on the friction-charged body,
   wherein the ferroelectric material layer is formed of the negatively poled ferroelectric material and has a negative charging property in relation to the friction-charged body, or
   wherein the ferroelectric material layer is formed of the positively poled ferroelectric material and has a positive charging property in relation to the friction-charged body.

* * * * *